US010198376B2

(12) United States Patent
Zheng

(10) Patent No.: US 10,198,376 B2
(45) Date of Patent: Feb. 5, 2019

(54) METHODS AND APPARATUS FOR ACCELERATING LIST COMPARISON OPERATIONS

(71) Applicant: Marvell World Trade Ltd., St. Michael (BB)

(72) Inventor: Jerry Hongming Zheng, Dublin, CA (US)

(73) Assignee: Marvell World Trade Ltd., St. Michael (BB)

( * ) Notice: Subject to any disclaimer, the term of this patent is extended or adjusted under 35 U.S.C. 154(b) by 205 days.

(21) Appl. No.: 15/220,684

(22) Filed: Jul. 27, 2016

(65) Prior Publication Data

US 2017/0038996 A1 Feb. 9, 2017

Related U.S. Application Data

(60) Provisional application No. 62/218,296, filed on Sep. 14, 2015, provisional application No. 62/200,436,
(Continued)

(51) Int. Cl.
*G06F 12/08* (2016.01)
*G06F 13/24* (2006.01)
(Continued)

(52) U.S. Cl.
CPC .............. *G06F 13/24* (2013.01); *G06F 1/08* (2013.01); *G06F 3/0604* (2013.01); *G06F 3/0638* (2013.01); *G06F 3/0683* (2013.01); *G06F 9/4401* (2013.01); *G06F 12/08* (2013.01); *G06F 13/36* (2013.01); *G06F 13/364* (2013.01); *G06F 13/404* (2013.01); *G06F 13/4068* (2013.01); *G06F 13/4282* (2013.01);
(Continued)

(58) Field of Classification Search
CPC ........................................................ G06F 12/08
USPC ................................................... 711/117, 118
See application file for complete search history.

(56) References Cited

U.S. PATENT DOCUMENTS 5,845,327 A 12/1998 Rickard et al.
6,215,685 B1 * 4/2001 Fung ...................... G11C 15/00
365/189.011
(Continued)

OTHER PUBLICATIONS

Wong, W., "Q&A: A Deeper Look at Marvell's MoChi Technology," *Electronic Design*, 4 pages (Jun. 6, 2016) (accessed on Jun. 6, 2016 at http://electronicdesign.com/digital-ics/qa-deeper-look-marvell-s-mochi-technology).

*Primary Examiner* — Hoai V Ho
*Assistant Examiner* — Jay Radke

(57) ABSTRACT

Comparison circuitry includes a first memory that stores a list of data items, a second memory that stores a list of most-recently used ones of the data items, a first comparator that compares an input data item first to the ones of the data items in the second memory and, only in absence of a hit in the second memory, compares the input data item to the data items in the first memory. At least one additional comparator may operate in parallel with the first comparator to compare the input data item to respective data items in at least one additional second memory, and to compare the input data item to respective data items in the first memory in absence of a respective hit in the at least one additional second memory. A data communications system may include a decoder incorporating such comparison circuitry.

14 Claims, 2 Drawing Sheets

Related U.S. Application Data filed on Aug. 3, 2015, provisional application No. 62/200,462, filed on Aug. 3, 2015, provisional application No. 62/200,444, filed on Aug. 3, 2015, provisional application No. 62/200,452, filed on Aug. 3, 2015.

(51) Int. Cl.

| | | |
|---|---|---|
| *G06F 13/36* | (2006.01) | |
| *G06F 1/08* | (2006.01) | |
| *G06F 3/06* | (2006.01) | |
| *G06F 13/40* | (2006.01) | |
| *H04L 12/741* | (2013.01) | |
| *H04L 12/861* | (2013.01) | |
| *H04L 29/06* | (2006.01) | |
| *H04L 29/08* | (2006.01) | |
| *G06F 13/364* | (2006.01) | |
| *G06F 13/42* | (2006.01) | |
| *G06F 15/78* | (2006.01) | |
| *G06F 9/4401* | (2018.01) | |

(52) U.S. Cl.
CPC ......... *G06F 15/7807* (2013.01); *H04L 45/74* (2013.01); *H04L 49/90* (2013.01); *H04L 69/22* (2013.01); *H04L 69/324* (2013.01)

(56) References Cited

U.S. PATENT DOCUMENTS

| | | | |
|---|---|---|---|
| 6,584,550 B1 * | 6/2003 | James | G06F 12/0824 711/145 |
| 7,024,519 B2 * | 4/2006 | Magoshi | G06F 12/0811 711/119 |
| 2005/0225558 A1 | 10/2005 | Morein et al. | |
| 2013/0132658 A1 | 5/2013 | Matsuse | |
| 2013/0191587 A1 | 7/2013 | Torii | |
| 2015/0169495 A1 | 6/2015 | Zheng | |
| 2016/0132434 A1 * | 5/2016 | Brandt | G06F 12/0808 711/122 |

\* cited by examiner

METHODS AND APPARATUS FOR ACCELERATING LIST COMPARISON OPERATIONS

CROSS REFERENCE TO RELATED APPLICATIONS

This claims the benefit of commonly-assigned U.S. Provisional Patent Applications Nos. 62/200,436, 62/200,444, 62/200,452 and 62/200,462, all filed Aug. 3, 2015, and 62/218,296, filed Sep. 14, 2015, each of which is hereby incorporated by reference herein in its respective entirety.

FIELD OF USE

Implementations of the subject matter of this disclosure generally pertain to apparatus and methods for performing list comparisons. In particular, implementations of the subject matter of this disclosure pertain to apparatus and methods for accelerating list comparisons by checking recent "hits" first.

BACKGROUND

The background description provided herein is for the purpose of generally presenting the context of the disclosure. Work of the inventors hereof, to the extent the work is described in this background section, as well as aspects of the description that may not otherwise qualify as prior art at the time of filing, are neither expressly nor impliedly admitted to be prior art against the present disclosure.

In electronic systems that execute software, firmware or microcode (hereafter collectively referred to as "software" or "instructions"), under control, e.g., of a processor, microprocessor or microcontroller (hereafter collectively referred to as a "processor"), it is frequently necessary to compare a data item to a list of data items. The number of comparisons that can be performed during each system clock cycle is limited, and decreases as the size of the items being compared increases. If all necessary comparisons cannot be performed within a single clock cycle, system performance may suffer.

SUMMARY

Comparison circuitry according to implementations of the subject matter of this disclosure includes a first memory that stores a list of data items, a second memory that stores a list of most-recently used ones of the data items, a first comparator that compares an input data item first to the ones of the data items in the second memory and, only in absence of a hit in the second memory, compares the input data item to the data items in the first memory.

In one implementation of such comparison circuitry, the first memory and the second memory may be separate memory devices. In another implementation of such comparison circuitry, the first memory and the second memory may be separate portions of a single memory device.

In such comparison circuitry, the first comparator may be a processor, operation of the processor is clocked, the second memory is sized to contain a number of the data items, and the number of the data items is a number of the data items on which the processor performs operations in a single clock cycle.

In one implementation of such comparison circuitry, in the absence of a hit in the second memory, the first comparator compares the input data item to all of the data items in the first memory. In another implementation of such comparison circuitry, the first comparator compares the input data item only to the data items in the first memory that are not also in the second memory. In that other implementation, the first memory includes a respective flag for each respective data item stored in the first memory, to indicate whether the respective data item also is stored in the second memory.

Such comparison circuitry may further include at least one additional comparator. Each respective one of the at least one additional comparator operates in parallel with the first comparator to compare the input data item to respective data items in at least one additional one of the second memory, and to compare the input data item to respective data items in the first memory in absence of a respective hit in the at least one additional one of the second memory.

A data communications system according to implementations of the subject matter of this disclosure includes a plurality of integrated circuit devices, and a data bus interconnecting the plurality of integrated circuit devices. At least one of the integrated circuit devices in the plurality of integrated circuit devices includes decoding circuitry, and the decoding circuitry includes a first memory that stores a list of data items, a second memory that stores a list of most-recently used data items, a first comparator that compares an input data item first to data items in the second memory and, only in absence of a hit in the second memory, compares the input data item to data items in the first memory.

In such a data communications system, the first comparator may include a processor, operation of the processor is clocked, the second memory is sized to contain a number of data items, and the number of data items is a number of data items on which the processor performs operations in a single clock cycle.

A comparison method according to implementations of the subject matter of this disclosure, for use in a data communications system, includes storing a list of data items, storing a list of most-recently used ones of the data items, comparing an input data item first to the list of most-recently used ones of the data items and, only in absence of a hit in the list of most-recently used ones of the data items, comparing the input data item to the list of the data items, for decoding the input data item for use in said data communications system.

In one implementation of such a comparison method, the storing the list of data items and the storing the list of the most-recently used ones of the data items includes storing the list of data items in a first memory device, and storing the list of the most-recently used ones of the data items in a second memory device. In another implementation of such a comparison method, the storing the list of data items and the storing the list of the most-recently used ones of the data items includes storing the list of data items and the list of the most-recently used ones of the data items in first and second portions of a single memory device.

In such a comparison method the comparing may be clocked, and the number of data items in the list of the most-recently used ones of the data items is a number of data items on which the comparing is performed in a single clock cycle.

In one implementation of such a comparison method, the comparing the input data item to the list of the data items includes comparing the input data item to all data items in the list of the data items. In another implementation of such a comparison method, the comparing the input data item to the list of the data items includes comparing the input data item only to data items in the list of the data items that are not also in the list of the most-recently used ones of the data items. In that other implementation of such a comparison method, the storing a list of data items includes storing a respective flag for each respective data item in the list of the data items, to indicate whether the respective data item also is in the list of the most-recently used ones of the data items.

In such a comparison method, the comparing an input data item first to list of most-recently used ones of the data items may include comparing the input data item in parallel to respective data items in the list of most-recently used ones of the data items, and to respective data items in list of the data items in the absence of a respective hit in the list of most-recently used ones of the data items.

BRIEF DESCRIPTION OF THE DRAWINGS

Further features of the disclosure, its nature and various advantages, will be apparent upon consideration of the following detailed description, taken in conjunction with the accompanying drawings, in which like reference characters refer to like parts throughout, and in which.

DETAILED DESCRIPTION

Figure 1:
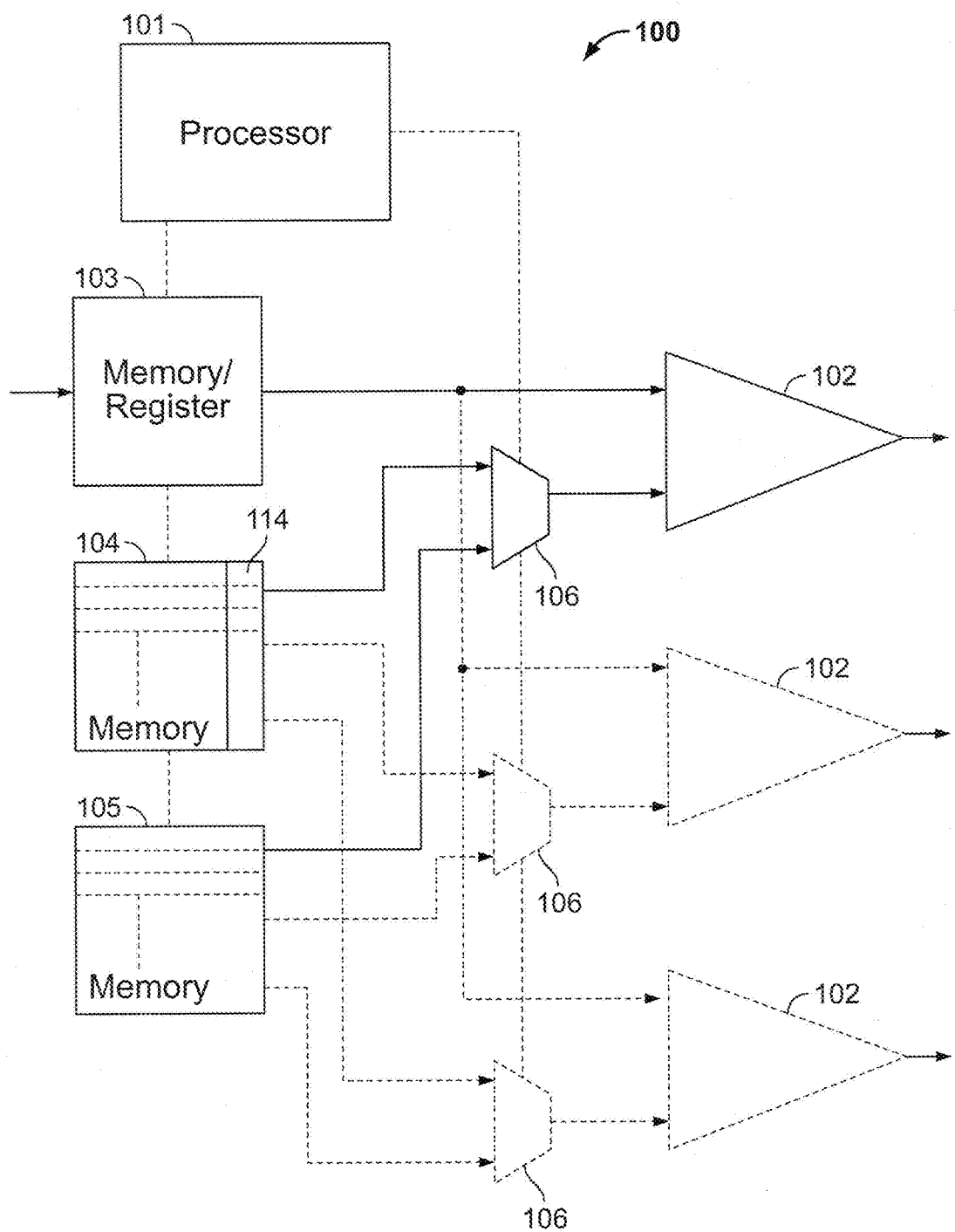
FIG. 1 shows a processor arrangement for performing comparison operations according to implementations of the subject matter of this disclosure.

As discussed above, in electronic systems that execute instructions under control of a processor, it is frequently necessary to compare a data item to a list of data items. The number of comparisons that can be performed during each system clock cycle is limited, and decreases as the size of the items being compared increases. If all necessary comparisons cannot be performed within a single clock cycle, system performance may suffer.

For example, in a system with multiple addressable components, a table of addresses may be provided to associate each logical address with a particular physical component. To communicate with a desired component, an address is decoded by finding the address in the table, thereby identifying the associated component. To find the address in the table, the address is compared to each entry in the table until a match is found. If the time needed to compare each entry in the table, and the number of entries that need to be compared, are great enough, the comparison will not be completed within a single clock cycle. While the amount of time needed for each comparison may be a function of the particular comparison scheme used, for any given comparison scheme—even if the comparison scheme is the fastest available comparison scheme—there will be a maximum number of comparisons that can be performed in a single clock cycle.

In accordance with implementations of the subject matter of this disclosure, comparison of an incoming data item to a list of other data items can be accelerated by judiciously choosing the order of comparison. Thus, rather than compare the incoming data item to the list of other data items in the order in which the other data items appear in the list, a different order is selected. In particular, a separate list of most-recently used ones of the items in the list of other data items may be maintained, and the incoming data item is compared to most-recently used items in the separate list before being compared (if necessary) to the larger list of other data items.

The number of items kept in the separate list of most-recently used items may be selected to keep the time needed to compare the incoming data item to the separate list of most-recently used items to within one clock cycle. At least the approximate length of time needed for each comparison would be known and the number of items in the separate list of most-recently used items can be limited accordingly to keep the comparisons of those items to within one clock cycle. That number may be a function of the size of each data item. For example, if the incoming data item is an address as in the example above, and each address is eight bits long, the number of items that can be compared within one clock cycle might be larger than if each address were thirty-two bits long.

If the incoming data item is found in the list of most-recently used data items, then the comparison will occur within one clock cycle and system operations can continue without undue delay. If the incoming data item is not found in the list of most-recently used items, the system would have to compare the incoming data item to the complete list of data items. This could slow system operations, insofar as comparison with the complete list may take more than one clock cycle, and even several clock cycles, and this would be in addition to the clock cycle consumed by the unsuccessful comparison of the incoming data item to the list of most-recently used data items. One way to accelerate this longer comparison time is to exclude from the comparison those items in the list of most-recently used data items, as the incoming data item would already have been compared unsuccessfully to those items.

The data items discussed herein can be of many different types, including, but not limited to, device addresses, context IDs, storage locations or pointers, filenames, etc. It will be understood that any discussion herein of comparing an incoming data item to a list of data items refers to comparing the incoming data item to a list of data items of the same type. Thus, for example, an incoming device address would be compared to a list of device addresses, and not any other type of data items.

As one example only, comparison methods and apparatus in accordance with embodiments of this disclosure may be used with a modular chip "hopping bus" architecture, including multiple integrated circuit chips that communicate as though they are a single chip, as described in U.S. Patent Application Publication 2015/0169495, which is hereby incorporated by reference herein in its entirety. Such a system may operate at a high clock rate—e.g., 1 GHz—which translates to a very short clock cycle (1 ns) which allows only a small number of comparison operations.

In such a system, at least some of the chips, which may be referred to as "masters," will include a processor (as defined above) to manage the intra- and inter-chip protocol. Each chip will be assigned an address, and the processor on the "master" chip will perform comparisons as described herein to decode chip addresses. The processor may also, e.g., perform comparisons to decode context IDs from ID-based context look-up.

Implementations of the subject matter of this disclosure keep track of "last hit" (i.e., most-recently used) information, to create a two-level comparison schema. The N last hit items may be referred to as:

LH[1], LH[2], . . . LH[N]

N can be 1, 2, 4 or more, but N should be selected so that N items can be compared in a single cycle of the targeted clock rate.

For any new incoming data item to be compared, the new incoming data item can be compared to LH[1:N] in one clock cycle. If there is no hit from those comparisons, then the new incoming data items can be compared to all items, or the remaining items, over the next several clock cycles. It is apparent, then, that if the new incoming data item matches any of the "last hit" (i.e., most-recently used) data items, the comparison takes one clock cycle, but if the new incoming data item does not match any of the "last hit" data items, the comparison requires multiple cycles.

In an address decoding example, there may be 32 possible addresses decoding to 32 possible target zones:
New Address==destination address 0→decoded to target zone 0
New Address==destination address 1→decoded to target zone 1
⋮
New Address==destination address 31→decoded to target zone 31

A full comparison of 32 addresses cannot be performed in one cycle for a high-speed design, such as a system with a 1 GHz clock.

However, one can apply an implementation of the subject matter of this disclosure, as follows:
One can keep track of the four most recent decoding hits (i.e., N=4):
Last hit 1==destination address 10→decoded to target zone 10
Last hit 2==destination address 5→decoded to target zone 5
Last hit 3==destination address 11→decoded to target zone 11
Last hit 4==destination address 30→decoded to target zone 30

For the next new incoming address, one can perform four comparisons:
New Address==Last hit 1, destination address 10→decoded to target zone 10
New Address==Last hit 2, destination address 5→decoded to target zone 5
New Address==Last hit 3, destination address 11→decoded to target zone 11
New Address==Last hit 4, destination address 30→decoded to target zone 30

The four-comparator logic can run at very high speed and be completed in a single cycle. If there is no match, then the full comparison against all 32 addresses (or the remaining 28 addresses) can be performed, which will take multiple cycles.

In an ID-based context look-up example, there may be 64 possible context IDs (using an 8-bit ID) decoding to 32 possible contexts:
New Address==ID for context 0→look up context 0
New Address==ID for context 1→look up context 1
⋮
New Address==ID for context 31→look up context 31

A full comparison of 64 context IDS cannot be performed in one cycle for a high-speed design, such as a system with a 1 GHz clock.

However, one can apply an implementation of the subject matter of this disclosure, as follows:
One can keep track of the four most recent context hits (i.e., N=4):
Last hit 1==ID for context 10→look up context 10
Last hit 2==ID for context 5→look up context 5
Last hit 3==ID for context 11→look up context 11
Last hit 4==ID for context 30→look up context 30

For the next new incoming address, one can perform four comparisons:
New Address==Last hit 1, ID for context 10→look up context 10
New Address==Last hit 2, ID for context 5→look up context 5
New Address==Last hit 3, ID for context 11→look up context 11
New Address==Last hit 4, ID for context 30→look up context 30

The four-comparator logic can run at very high speed and be completed in a single cycle. If there is no match, then the full comparison against all 64 context IDs (or the remaining 60 context IDs) can be performed, which will take multiple cycles.

FIG. 1 shows a processor arrangement 100 for performing comparison operations according to implementations of the subject matter of this disclosure, whether included in a modular chip "hopping bus" architecture as described in above-incorporated U.S. Patent Application Publication 2015/0169495, or otherwise. Processor 101 controls the comparison operations in comparator 102. Comparator 102 may be a separate hardware comparator, or may implemented as software in processor 101. A plurality of comparators 102 may be provided (additional instances of comparator 102 are shown in phantom) to allow multiple comparisons to be performed in parallel, which increases the number of comparisons that can be performed within a single clock cycle.

The incoming data item to be compared is stored in a memory or register 103 on one input of comparator 102. The full set of data items against which the incoming data item is to be compared is stored in a memory 104. A further memory 105 stores the most recent "hits" (i.e., the most-recently used data items), against which the incoming data item is first checked. A multiplexer 106 on the second input of comparator 102 selects the full set of data items in memory 104 or the most-recently used data items in memory 105 under control of processor 101. Memory 104 may have provisions for each stored item to be flagged at 114 so that if a memory item is one of the most-recently used data items in memory 105, it can be flagged, if desired, to be skipped when the incoming data item in memory 103 is compared against the full set of data items in memory 104, to avoid duplicate comparisons and thereby speed up the comparison against the full set of data items.

Although comparators 102 are shown as separate circuit elements, the comparison function denoted by each comparator 102 may actually be performed by software in processor 101. Similarly, while memories 103, 104, 105 are shown as separate memories, they may be implemented as separate portions (each of which may be contiguous or non-contiguous) within a single memory device.

Figure 2:
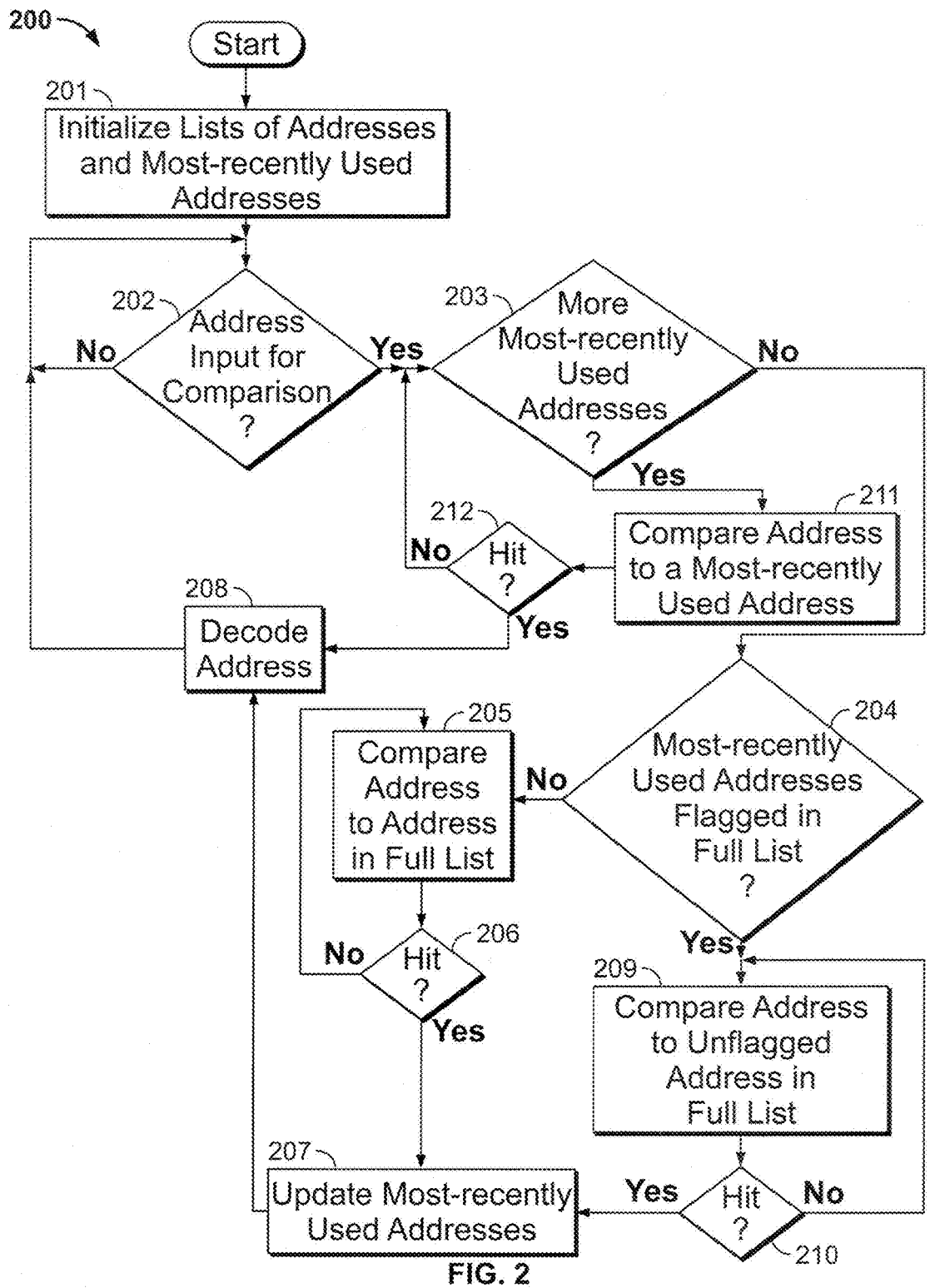
FIG. 2 is a flow diagram illustrating an implementation of a comparison method according to the subject matter of this disclosure.

FIG. 2 shows a flow diagram of an implementation of a comparison method 200 according to the subject matter of this disclosure. In method 200 as illustrated, the data items being compared are addresses, but this is only an example and the data items could be any kind of data items that need to be compared against a list of data items.

Method 200 starts at 201 where the complete list of addresses and the list of most-recently used addresses are initialized. The complete list of addresses is determined as the system is configured and all addressable system components are recognized. Initialization of the list of most-recently used addresses normally involves clearing the list.

At 202, the system waits for an address to be input. Once an address has been input, it is determined at 203 whether there are any more uncompared most-recently used addresses in the list of most-recently used addresses. On startup, the list of most-recently used addresses will be empty, so the answer will be "No." The full list of addresses will be checked at 204 to determine whether the most-recently used addresses are flagged in the full list of addresses. Again, on startup, the answer will be "No," and so the input address will be compared at 205 to an address in the full list of addresses.

At 206 it will be determined whether that comparison is a hit. If not, comparisons at 205 will continue until a hit is determined at 206 (in this implementation there is no such thing as an invalid input address, so there will eventually a hit; in implementations where an invalid address is a possibility, further checking to determine whether all addresses have been checked without a hit may be implemented). If at 206 a comparison at 205 is determined to be a hit, at 207 the list of most-recently used addresses is updated by adding the current address as the most-recently used address; the least-recently used address is discarded. Alternatively, to prevent a single frequently used address from occupying all spaces in the list of most-recently used addresses, if an address is already present in the list of most-recently used addressed, that address will not be added again, so that other addresses can remain in the list of most-recently used addresses. In such a case, the list of most-recently used addresses would have to contain an indication of recently each address in the list of most-recently used addresses was used, so that when a new address is added to the list of most-recently used addresses, it is known which address that is already in the list of most-recently used addresses is the least-recently used address and can be deleted. After updating of the list of most-recently used addresses, the input address is decoded at 208 and the system returns to 202 to await another input address.

If at 204 it is determined that most-recently used addresses are flagged in the full list, then at 209 the input address is compared to an unflagged address in full list of addresses. If there is a hit, as determined at 210, then at 207 the list of most-recently used addresses is updated by adding the current address as the most-recently used address, and the least-recently used address is discarded, and flow continues as above.

At times other than startup, at 203 there will be at least one most-recently used address in the list of most-recently used addresses. At 211, the input address will be compared to a most-recently used address in the list of most-recently used addresses, and if there is a hit as determined at 212, meaning the input address matches the most-recently used address in the list of most-recently used addresses that is being compared, the input address will be decoded at 208 and the system returns to 202 to await another input address.

If at 212 there is not a hit, meaning that the input address does not match the most-recently used address in the list of most-recently used addresses that is being compared, the system returns to 203 to see if there are any more most-recently used addresses in the list of most-recently used addresses that have not yet been compared. If so, the system returns to 211 to compare the input address to the next most-recently used addresses in the list of most-recently used addresses and flow continues as before. If at 203 there are no more most-recently used addresses in the list of most-recently used addresses, the system continues to 204 and flow continues as before.

Thus it seen that methods and apparatus for accelerating list comparison operations have been provided.

It will be understood that the foregoing is only illustrative of the principles of the invention, and that the invention can be practiced by other than the described embodiments, which are presented for purposes of illustration and not of limitation, and the present invention is limited only by the claims which follow.

What is claimed is:

1. Comparison circuitry comprising:
a first memory that stores a list of data items;
a second memory that stores a list of most-recently used ones of the data items; and
a first comparator that compares an input data item first to the ones of the data items in the second memory and, only in absence of a hit in the second memory, compares the input data item to the data items in the first memory; wherein:
the first memory is configured to store, for each respective data item stored in the first memory, a respective flag to indicate whether the respective data item also is stored in the second memory; and
in the absence of a hit in the second memory, the first comparator compares the input data item only to the data items in the first memory that are not also in the second memory.

2. The comparison circuitry of claim 1 wherein the first memory and the second memory are separate memory devices.

3. The comparison circuitry of claim 1 wherein the first memory and the second memory are separate portions of a single memory device.

4. The comparison circuitry of claim 1 wherein:
the first comparator comprises a processor;
operation of the processor is clocked;
the second memory is sized to contain a number of the data items; and
the number of the data items is a number of the data items on which the processor performs operations in a single clock cycle.

5. The comparison circuitry of claim 1 further comprising:
at least one additional one of the second memory; and
at least one additional comparator; wherein:
each respective one of the at least one additional comparator operates in parallel with the first comparator to compare the input data item to respective data items in a respective additional one of the second memory, and to compare the input data item to respective data items in the first memory in absence of a respective hit in the respective additional one of the second memory.

6. A data communications system comprising:
a plurality of integrated circuit devices; and
a data bus interconnecting the plurality of integrated circuit devices, wherein:
at least one of the integrated circuit devices in the plurality of integrated circuit devices includes decoding circuitry, the decoding circuitry comprising:
a first memory that stores a list of data items;
a second memory that stores a list of most-recently used ones of the data items; and
a first comparator that compares an input data item first to data items in the second memory and, only in absence of a hit in the second memory, compares the input data item to data items in the first memory; wherein:
the first memory is configured to store, for each respective data item stored in the first memory, a respective flag to indicate whether the respective data item also is stored in the second memory; and in the absence of a hit in the second memory, the first comparator compares the input data item only to the data items in the first memory that are not also in the second memory.

7. The data communications system of claim 6 wherein the input data item is an address to be decoded.

8. The data communications system of claim 6 wherein the input data item is a context ID to be decoded.

9. The data communications system of claim 6 wherein:
the first comparator comprises a processor;
operation of the processor is clocked;
the second memory is sized to contain a number of data items; and
the number of data items is a number of data items on which the processor performs operations in a single clock cycle.

10. A comparison method for use in a data communications system, said comparison method comprising:
storing a list of data items;
storing a list of most-recently used ones of the data items;
storing a respective flag for each respective data item in the list of the data items, to indicate whether the respective data item also is in the list of the most-recently used ones of the data items; and
comparing an input data item first to the list of most-recently used ones of the data items and, only in absence of a hit in the list of most-recently used ones of the data items, comparing the input data item only to the data items in the list of the data items that are not also in the list of most-recently used ones of the data items, for decoding the input data item for use in said data communications system.

11. The comparison method of claim 10 wherein the storing the list of data items and the storing the list of most-recently used ones of the data items comprises:

storing the list of data items in a first memory device; and
storing the list of the most-recently used ones of the data items in a second memory device.

12. The comparison method of claim 10 wherein the storing the list of data items and the storing the list of the most-recently used ones of the data items comprises storing the list of data items and the list of the most-recently used ones of the data items in first and second portions of a single memory device.

13. The comparison method of claim 10 wherein:
the comparing is clocked; and
the number of data items in the list of the most-recently used ones of the data items is a number of data items on which the comparing is performed in a single clock cycle.

14. The comparison method of claim 10, wherein:
the storing the list of the most-recently used ones of the data items comprises storing at least two respective lists of the most-recently used ones of the data items;
the comparing an input data item first to the list of most-recently used ones of the data items comprises comparing the input data item in parallel to respective data items in respective ones of the at least two lists of the most-recently used ones of the data items; and
the comparing, only in absence of a hit in the list of most-recently used ones of the data items, the input data item only to the data items in the list of the data items that are not also in the list of most-recently used ones of the data items comprises comparing the input data item only to respective data items in the list of the data items that are not also in the respective ones of the at least two lists of the most-recently used ones of the data items.

* * * * *